UNITED STATES PATENT OFFICE.

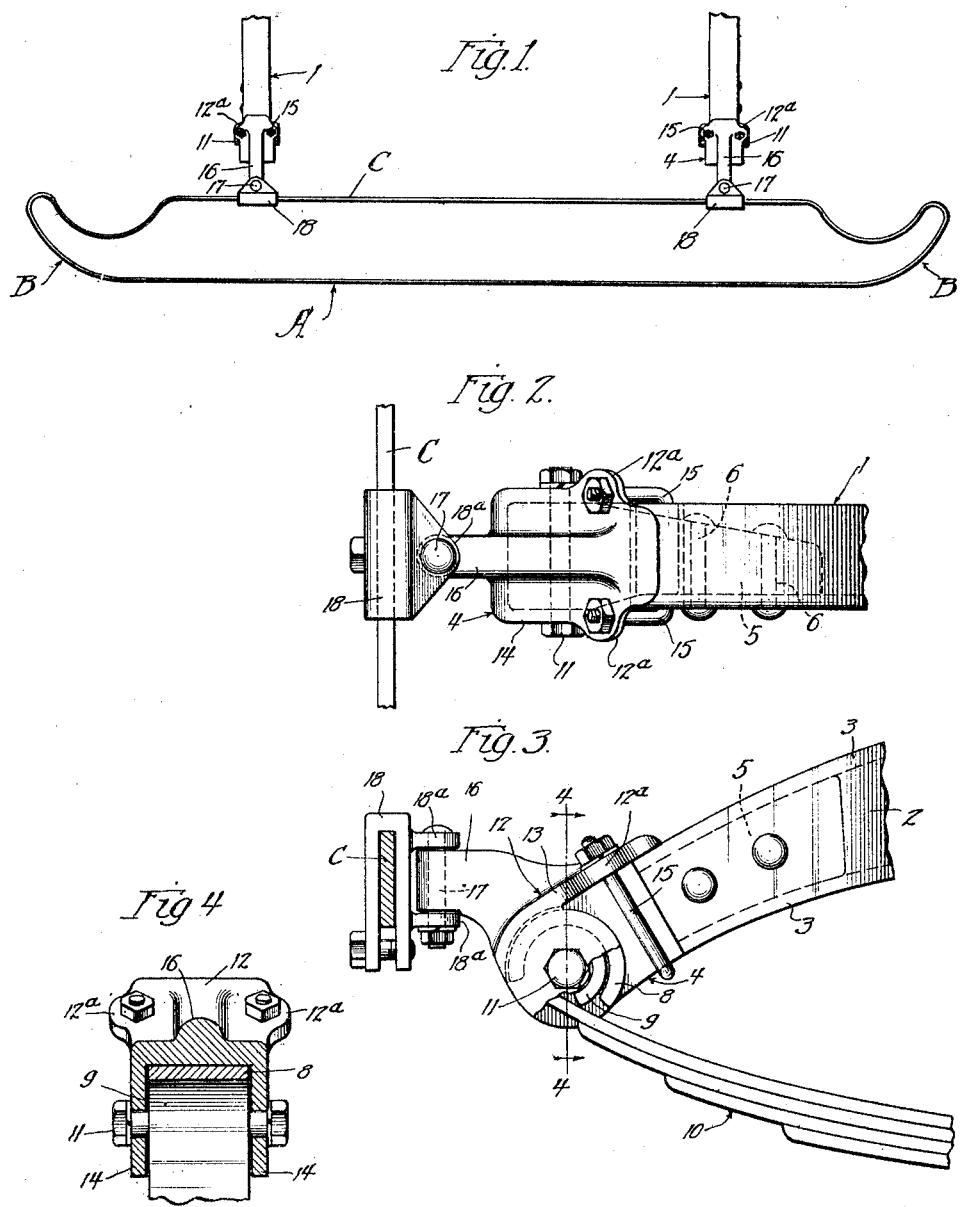

ALLAN L. McGREGOR, OF CHICAGO, ILLINOIS.

BUMPER-ATTACHING FITTING.

1,372,159.   Specification of Letters Patent.   Patented Mar. 22, 1921.

Application filed January 17, 1921. Serial No. 437,739.

*To all whom it may concern:*

Be it known that I, ALLAN L. McGREGOR, a citizen of the United States, and a resident of Chicago, in the county of Cook and State of Illinois, have invented certain new and useful Improvements in Bumper-Attaching Fittings, of which the following is a specification.

This invention relates to improvements in bumper attaching fittings designed especially for the attachment of bumpers to the frame members of motor vehicles.

The object of the present invention is to provide a construction for a fitting which may be built into the frame of a motor vehicle, thereby affording a means for the ready connection of bumpers, which otherwise are applied by the use of connecting members such as clamping devices, bolts, and the like. In short, it is proposed to incorporate a bumper attaching member into a vehicle frame as an integral part thereof.

In the drawings is illustrated a preferred construction for a fitting embodying the invention, and which may be briefly described as follows:

Figure 1 is a top plan view of the forward ends of the frame members of a motor vehicle, with a bumper supported by means of the fittings, Fig. 2 is an enlarged top plan view of the fitting, Fig. 3 is an enlarged view in side elevation of the fitting and bumper, and Fig. 4 is a view in vertical section taken on line 4—4 of Fig. 3.

As a suitable bumper that may be attached to a vehicle is disclosed the familiar type of resilient bar bumper, consisting of a front impact member A, having end portions B—B bent rearwardly and inwardly in U-shape, and a rearwardly spaced member C having direct connection with the attaching fittings about to be described in detail.

The frame members 1—1 of a motor vehicle ordinarily have the form of channel bars, consisting of a vertical web 2, and horizontal webs 3—3. The usual practice is to shape the ends of the frame members to provide heads or cylindric extremities forming a support for the pivot bolt connecting the ends of the springs with the ends of the frame members. In adapting the fitting of the invention to a frame member (it being understood that the two members 1—1 are threaded in like manner) the frame member is cut short, eliminating the usual frame head, and terminating in an oblique end of U-shaped contour, as shown in Fig. 3.

The fitting, which is to be understood as a forged or cast metal member adapted to replace the usual end formation of a frame member, comprises a body portion 4, and a shank portion 5, the latter conforming generally to the channel of the frame member, and adapted to lie therein in flatwise contact with the horizontal and vertical webs 2 and 3. The shank is preferably tapered toward its rear end, and as a means for permanently connecting the fitting to the end of the frame member, a suitable number of rivets 6 are inserted through the webs of the frame member, and the shank portion 5 of the fitting. The body portion 4 extends beyond the end of the frame member, and the base of the shank portion 5, there being formed a shoulder as at 7 (Figs. 2 and 3) against which the end of the frame member abuts.

The body portion consisting of those parts beyond the end of the frame member, comprises a cylindric shaped head 8 extending transversely of the body member, and forming an annular housing adapted to receive the eye 9 formed at the end of the upper half of the vehicle spring 10, in accordance with the usual practice. A spring bolt 11 extends axially of the head 8, and through the eye 9, although not directly supported by the head, as will be presently seen. As clearly shown in Fig. 3, the ends of the head 8 are open, and the lower portion removed, thereby providing an opening for inserting the eye 9 of the spring. Mounted upon the body portion of the fitting and inclosing the head 8 is a bracket 12, comprising integral parts as follows: A base plate 13 disengages the upper surface of the body portion flatwise, and is curved at its forward end around the corresponding portion of the head 8. On either side of the plate 13 are depending annular plates or ears 14—14 adapted to fit concentrically over the open ends of the head 8 forming a closure therefor. Furthermore, these ears 14—14 have holes drilled at their centers, which carry the spring bolt 11, the latter serving also to connect the bracket to the body portion in coöperation with a U-bolt 15 surrounding the body portion above the head 8, and anchored at its ends in laterally projecting ears 12ª—12ª integral with the base plate 12.

Extending upwardly and forwardly from the top surface of the base plate is an integral arm 16 terminating in a vertically disposed extremity in which is mounted a hinge bolt 17. Pivotally connected with the arm by means of said bolt 17 is a clamping block 18 provided with ears 18ª—18ª bearing above and below the arm 16, and carrying the ends of the bolt 17. The clamping block 18 is of any suitable construction, preferably comprising a U-shaped member adapted to retain in clamping engagement the bar C of the bumper.

From the foregoing description, it is manifest that the bracket is separable from the body member, and is capable of rotative adjustment about the head 8, and the spring bolt 11, by loosening the same slightly as well as the U-bolt 15. Normally, the parts are fixed in the position shown, although the necessary adjustment may be made by releasing the U-bolt, swinging the rear end of the plate away from the body member, and inserting a wedge between. The purpose of providing for the limited degree of adjustment is to maintain, or rather insure, the horizontal position of the bumper, this being obviously dependent upon the vertical position of the end of the arm 16.

Having described the structure, and purposes thereof, I claim as my invention:

1. A bumper attaching fitting for vehicle frames comprising a shank portion having permanent connection with the end of the vehicle frame member, a head at the end of said shank, a housing fitting over said head, and adjustably connected thereto, and a bumper supporting member integral with said housing.

2. A bumper attaching fitting for vehicle frames comprising a shank adapted to be fixed to the end of a frame member, an integral cylindric head at the outer end of the said shank, and a housing fitting over said head and adapted for adjustment about a horizontal axis, and means for securing said housing in several positions of adjustment, and a bumper attaching arm integral with said housing.

3. A bumper attaching fitting comprising a shank adapted to be fixed lengthwise of a vehicle frame member, an integral head at one end of said shank, having a horizontal bore adapted to receive the end of the spring and spring bolt, a housing adjustably fitting over said head and comprising plates engaging the ends of said head, and supporting said spring bolt, and a bumper attaching arm integral with said housing.

4. A bumper attaching fitting comprising a shank adapted for fixed connection with the end portion of a vehicle frame member, a cylindric head at the other end of said shank, a housing fitting over said head and adapted for rotative adjustment about the axis of said head, said housing being provided with an integral arm adapted for connection with a bumper.

5. A bumper attaching fitting comprising a shank adapted for fixed connection with the end of a vehicle frame member, a hollow cylindric head at the other end of said shank, and a housing substantially inclosing said head and adapted for rotative adjustment thereon, said housing comprising integral plates bearing against the ends of said head, and supporting the ends of a spring bolt, a rearwardly extending arm supporting a U-bolt adapted to surround the shank adjacent said head, and a forwardly extending arm adapted to have pivotal connection with a bumper.

In witness whereof, I hereunto subscribe my name this 11th day of January, A. D., 1921.

ALLAN L. McGREGOR